United States Patent [19]

Kopich et al.

[11] 4,282,949
[45] Aug. 11, 1981

[54] HUB LOCKS FOR INDEPENDENTLY SUSPENDED WHEELS

[75] Inventors: Leonard F. Kopich, Madison Heights; James A. Steele, Brighton, both of Mich.

[73] Assignee: General Motors Corporation, Detroit, Mich.

[21] Appl. No.: 89,189

[22] Filed: Oct. 29, 1979

[51] Int. Cl.³ .................. B60K 17/30; F16D 11/04
[52] U.S. Cl. .................... 180/252; 180/247; 192/67 R; 192/85 A
[58] Field of Search ............ 180/252, 247, 233, 256; 192/67 R, 83, 85 A, 85 C, 85 CA, 93 A

[56] References Cited

U.S. PATENT DOCUMENTS

| | | | |
|---|---|---|---|
| 2,874,814 | 2/1959 | Beck | 192/38 |
| 2,883,025 | 4/1959 | McKim | 192/67 |
| 2,907,432 | 10/1959 | Strickland et al. | 192/71 |
| 2,910,845 | 11/1959 | Wahlmark | 64/21 |
| 2,913,929 | 11/1959 | Anderson | 74/710.5 |
| 3,050,321 | 8/1962 | Howe et al. | 192/67 R |
| 3,123,169 | 3/1964 | Young et al. | 180/247 |
| 3,262,512 | 7/1966 | O'Brien | 180/247 |
| 3,283,842 | 11/1966 | Watt | 180/256 |
| 3,476,200 | 11/1969 | Schoepe et al. | 180/256 |
| 4,057,120 | 11/1977 | Roethlisberger | 180/263 |

Primary Examiner—Joseph F. Peters, Jr.
Assistant Examiner—Donn McGiehan
Attorney, Agent, or Firm—F. J. Fodale

[57] ABSTRACT

An independently suspended steering wheel has a hub lock for connecting and disconnecting the steering wheel to a variable length drive axle which includes a universal joint at each end. One hub lock part is connected to a wheel stub shaft journalled in the wheel hub. The other part of the hub lock is connected to a skirt portion of one universal joint which slides in a counterbore of the wheel hub. A spring plunger in the other universal joint normally biases the drive axle to an extended position where the hub lock is disengaged. The hub lock is engaged by a fluid motor incorporated in the wheel hub or an external selector which retracts the drive axle. A pneumatically controlled hydraulic pressure system operates the fluid motor.

2 Claims, 7 Drawing Figures

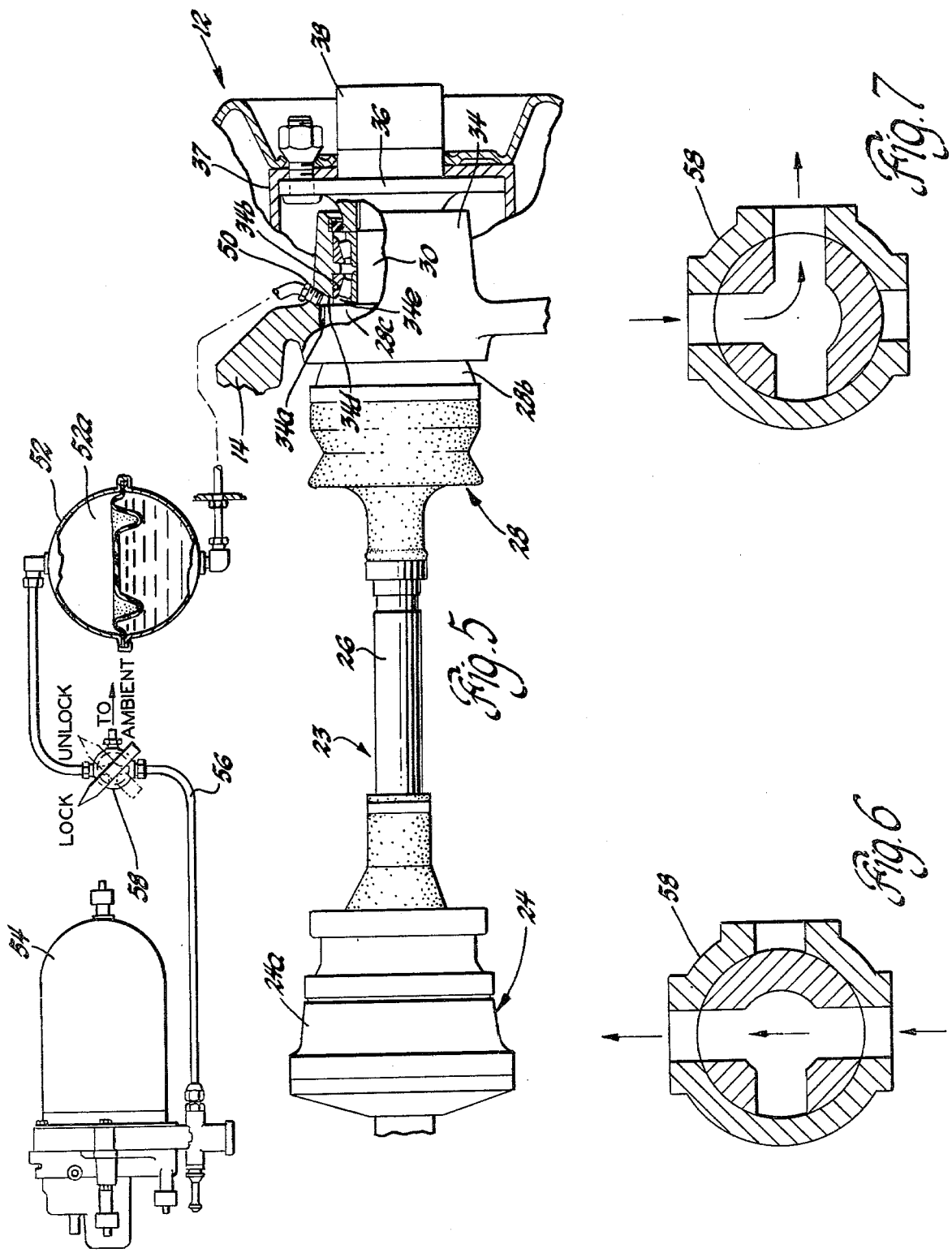

HUB LOCKS FOR INDEPENDENTLY SUSPENDED WHEELS

This invention relates generally to hub locks for wheels which are optionally driven such as the front wheels of four wheel drive vehicles and more particularly to hub locks for optionally driven wheels which are independently suspended from the vehicle frame.

Many four wheel drive vehicles have two optionally driven wheels, usually the front steering wheels. The drive lines of such vehicles generally include a transfer case which has means, usually a clutch, for selectively engaging and disengaging the drive line to the portion between the transfer case and the front wheels. For some time it has been recognized that such a drive line has a major disadvantage in the two wheel drive mode because the drive line components between the transfer case and the front wheels are driven by the front wheels. This produces unnecessary power consumption and wear.

A common solution to this problem is to provide hub locks at each front wheel which disconnect the front wheel from the drive line so that the drive line components between the front wheels and the transfer case are not driven. Hub locks are often manually actuated at each front wheel. However hub locks are also remotely controlled for convenient operation by the vehicle driver. For instance U.S. Pat. No. 3,123,169 granted to Ralph C. Young and Richard T. Bingman Mar. 3, 1964 shows a remotely controlled wheel hub having an electromagnetically actuated roller clutch for connecting and disconnecting the front wheels to their axle shafts. It is also known from U.S. Pat. No. 2,913,929 granted to Martin E. Anderson Nov. 24, 1959 to use remotely controlled, mechanically actuated, lug clutches to disconnect the axle shafts from the output shafts of the front differential.

The known prior art devices shown in the aforementioned Young et al and Anderson patents are shown in conjunction with solid axle housings. However, today it is more common to provide independently suspended front driving wheels, as for instance disclosed in U.S. Pat. No. 4,057,120 granted to Jerry M. Roethlisberger on Nov. 8, 1977. In an independent suspension, each front wheel is connected to the front differential by a separate drive axle. Each drive axle comprises an inboard universal joint connected to the differential, a drive shaft, and an outboard universal joint connected to the wheel. It is well known to use a telescopic universal joint at the inboard end of the drive axle to provide a variable length drive axle which extends and contracts to accommodate suspension travel. A commonly used telescopic universal joint is a so-called tri-pot universal joint which is disclosed in U.S. Pat. No. 2,910,845 granted Gunnar A. Wahlmark on Nov. 3, 1959. Such joints have a very low resistance to telescopic or end motion because torque is transmitted by drive balls which roll in drive channels.

One object of this invention is to provide a hub lock for independently suspended wheels having variable length drive axles which is engaged and disengaged by changing the length of the drive axle.

Another object of this invention is to provide a hub lock for independently suspended wheels having variable length drive axles in which one part of the hub lock is carried by the wheel spindle and is engaged with a cooperating part carried by the drive axle by changing the length of the drive axle.

Yet another object of the invention is to provide a hub lock for an independently suspended wheel which is driven by a variable length drive axle which is especially suitable for optionally driven steering wheels and/or variable length drive axles having a telescopic universal joint at the inboard end of the type having a very low resistance to end motion.

A feature of the invention is that the hub lock can be adapted for manual actuation at the wheel hub, adapted for remote control by the vehicle operator, or both.

Another feature of the invention is that the hub lock may be controlled by a fluid motor incorporated at least partially in one of the drive axle universal joints.

Other objects and features of the invention will become apparent to those skilled in the art as the disclosure is made in the following detailed description of a preferred embodiment of the invention as illustrated in the accompanying sheets of drawing in which:

FIG. 5 is a drawing of a pneumatically controlled hydraulic system for operating the hub lock shown in FIGS. 1 through 4.

FIG. 6 is a view through the selector valve of FIG. 5 showing the selector valve in a locked position.

FIG. 7 is a view through the selector valve of FIG. 5 showing the selector valve in an unlocked position.

Figure 1:
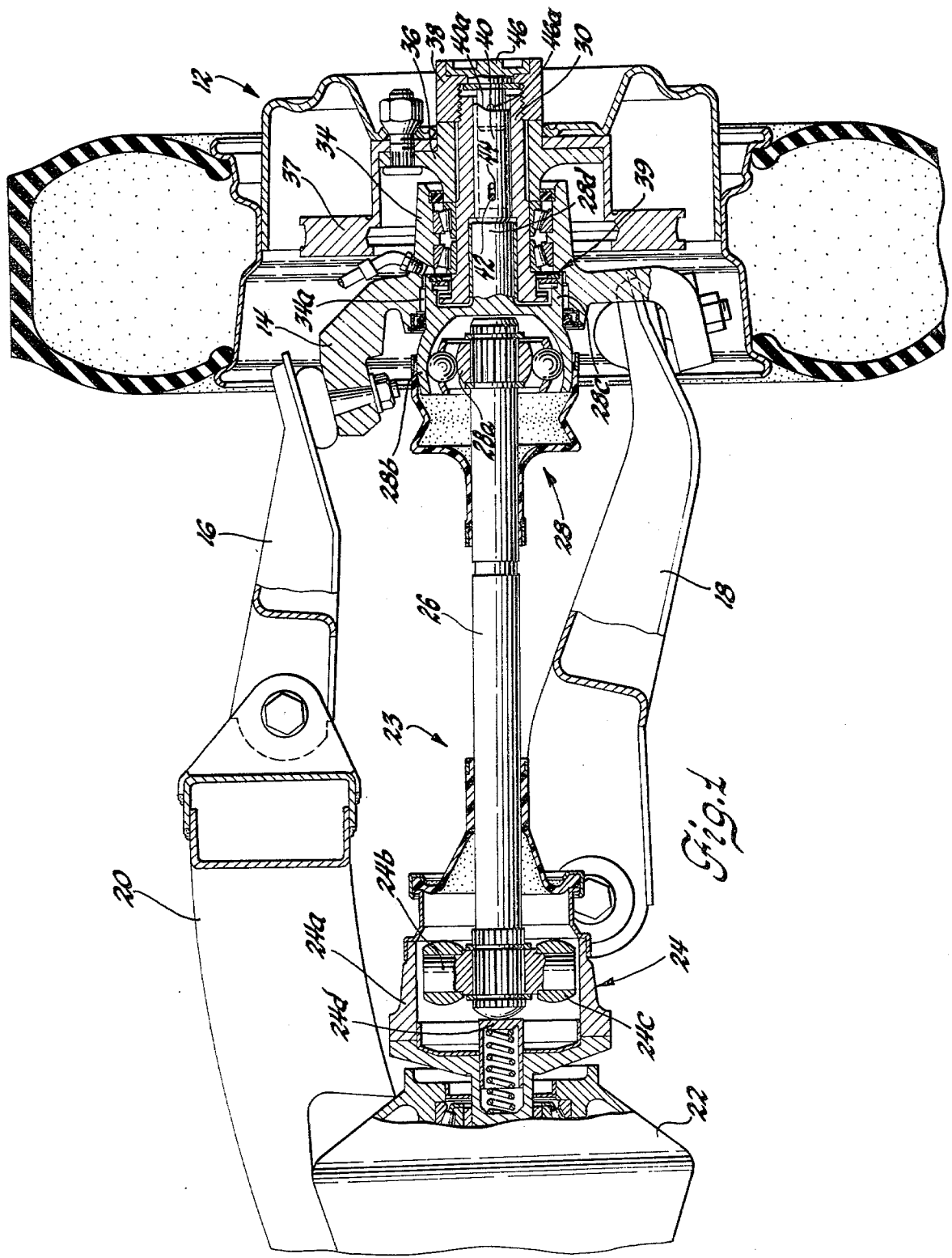
FIG. 1 is a front partially sectioned view of an independently suspended steering drive wheel having a hub lock.

Referring now to the drawing, FIG. 1 shows typical independent suspension for a steering drive wheel 12. The suspension comprises a steering knuckle 14 pivotally mounted by ball joints to upper and lower control arms 16 and 18 which in turn are hinged on the vehicle frame structure 20. The wheel 12 is steered by pivoting the steering knuckle about the steering axis established by the ball joints. The steering gear and linkage for pivoting the steering knuckle 14 has been omitted in the interest of clarity. Power from the engine is delivered through a drive train (not shown) to a differential 22 mounted on the frame structure 20. The differential 22 proportions the power between a drive axle 23 for drive wheel 12 and a second drive axle line for a second steering drive wheel (not shown). The drive axle 23 for the wheel 12 comprises an inboard universal joint 24, a drive shaft 26 and an outboard universal joint 28.

The inboard universal joint 24 is a telescopic joint which allows the length of the drive axle 23 to vary to accommodate suspension travel as is conventional practice. The joint 24 comprises an outer drive member or housing 24a which is secured to one of the differential output shafts (not shown) and an inner drive member which includes a spider 24b connected to the end of the drive shaft 26. The spider 24b has a number of equally circumferentially spaced pivots which carry a corresponding number of rotatable drive balls 24c which are disposed in respective longitudinal drive channels of the outer drive member 24a. The joint may have two drive balls and channels in which case the joint is known as a bi-pot joint. The joint may also have three drive balls and channels in which case the joint is known as a tri-pot joint. The tri-pot has constant velocity or nearly constant velocity operation whereas the bi-pot does not. Both joints, however, are characterized by a low resistance to telescopic or end motion since such a motion is accommodated by the drive balls 24c rolling in the longitudinal drive channels of the outer drive member 24a.

The universal joint 24, whether of the bi-pot or tri-pot configuration, also includes a spring biased plunger 24d which engages the end of the drive shaft 26 and extends the drive axle 23 for disengaging a hub lock as will hereinafter be more fully explained.

The outboard universal joint 28 is a fixed center universal joint, such as the well know Rzeppa joint shown in FIG. 1. This joint transmits rotary motion at uniform or constant velocity and comprises an inner drive member 28a which is splined to the end of the drive shaft 26 and outer drive member or bell 28b which is mounted on the steering knuckle 14. Construction details of a Rzeppa joint are well known and need not be explained. A unique feature, however, is that the joint 28 is slidably mounted on the steering knuckle 14. For this purpose the bell 28b has an outer annular skirt 28c which slides like a piston in a counterbore 34a at one end of the steering knuckle hub 34. The bell 28b has an elongated stem 28d which projects beyond the skirt 28c. This stem is normally splined or otherwise secured to a stub shaft which functions as the wheel spindle. However, in this instance the stem 28d is journalled in a sleeve bearing carried in a counterbore of a hollow stub shaft 30.

The hollow stub shaft 30 is rotatably mounted and axially fixed in the hub 34 of the steering knuckle 14 more or less conventionally by a duplex bearing arrangement comprising a pair of opposed taper roller bearings having their outer races abutting opposite sides of a central rib projecting inwardly into the hub bore 34b. The bearing inner races are mounted on the hollow stub shaft 30 and secured between a shoulder 30c of the shaft and a splined connected flange piece 36. The flange piece 36 is secured by an end cap 38 screwed onto the threaded end of the hollow stub shaft 30. The flange piece 36 carries a number of studs for mounting the wheel 12 and a brake disc 37.

Figure 3:
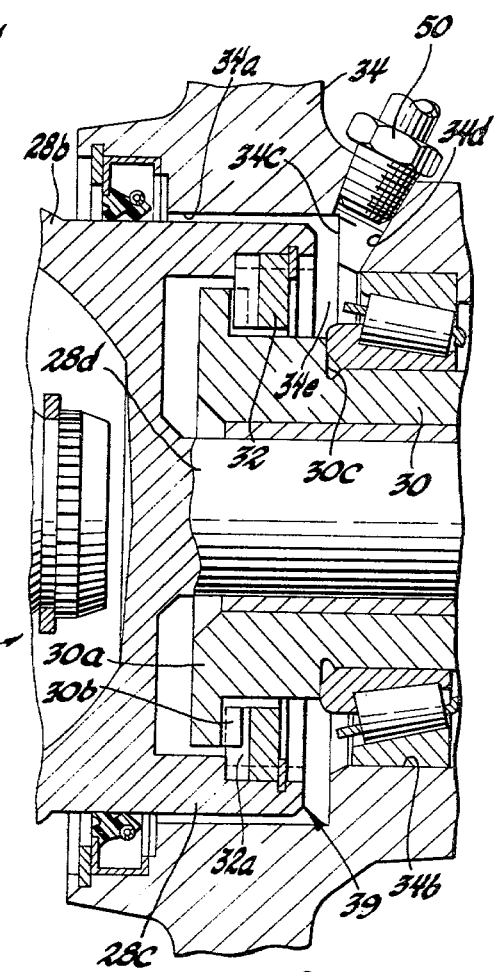
FIG. 3 is an enlargement similar to FIG. 2 showing the hub lock engaged.
Figure 4:
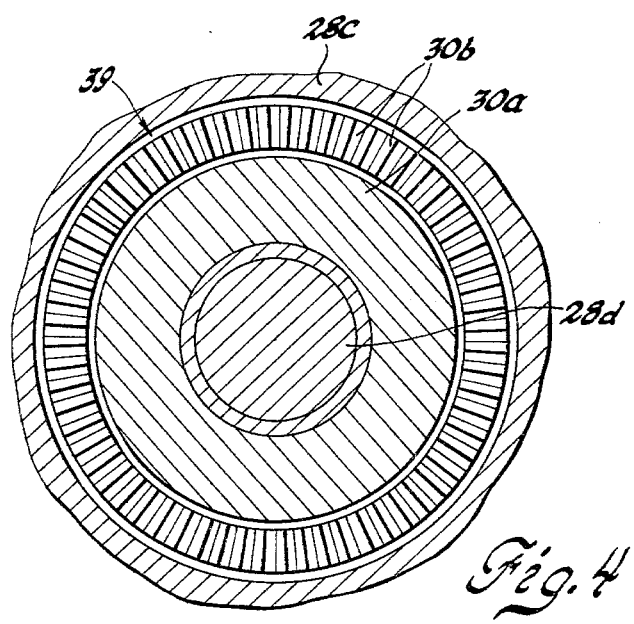
FIG. 4 is a section taken along the line 4—4 of FIG. 2 looking in the direction of the arrows.

The hollow stub shaft 30 has a flange 30a at its inboard end which is disposed inside the annular skirt 28c of the bell 28b. The flange 30a has circumferentially spaced axial lugs 30b and forms one part of a positive clutch type hub lock indicated generally at 39. The cooperating part is provided by an annular disc 32 which is splined at its outer diameter and fits in a splined counterbore at the open end of the annular skirt 28c. The disc 32 is held in place by a snap ring and has circumferentially spaced axial lugs 32a which face inward and mesh with the lugs 30b to engage the hub lock 39 as shown in FIG. 3.

The outboard end of the hollow stub shaft 30, the right end as viewed in FIG. 1, has a smaller diameter bore which carries a hollow slide 40. The slide is held against rotation in the bore by a cross pin 42 which is secured to the hollow stub shaft 30 and projects through longitudinal slots 44 through the wall of the hollow slide 40. The hollow slide 40 has a button at one end which engages the stem 28d of the bell 28b. The other end receives the stem of a selector 46 rotatably carried by the end cap 38. The outboard end face of the hollow slide 40 is a cam 40a and engaged by a cross pin 46a carried by the selector 46 so that the hollow slide 40 moves longitudinally in the bore in response to rotation of the selector 46. The selector 46 is used to manually engage and disengage the hub lock 39 as will hereinafter be more fully explained.

The hub 34 has seals at each end permitting the universal joint bell 28b and the steering knuckle hub 34 to act as a fluid motor as will hereinafter be more fully explained.

Figure 2:
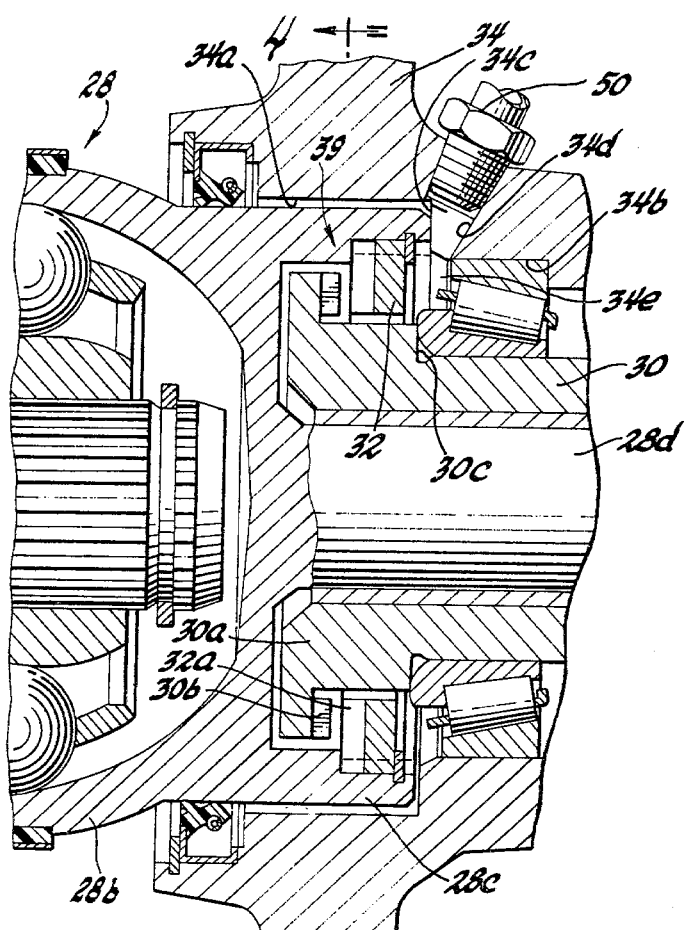
FIG. 2 is an enlargement of a portion of FIG. 1 showing the hub lock disengaged.

The operation of the hub lock will now be explained, assuming that the independently suspended wheel 12 shown in FIG. 1 is one of the front steering wheels of a four wheel drive vehicle having optionally driven front wheels which are selectively driven by connecting and disconnecting the front wheel drive line at a transfer case. This being the case, FIGS. 1 and 2 then show the two wheel drive mode where the front wheel 12 is not driven. For this condition the front wheel 12 is disconnected from the drive axle 23 under the action of the spring biased plunger 24d which operates to extend the variable length drive axle 23. Thus the inner drive member (spider 24b and balls 24c) of the telescopic joint 24, the drive shaft 26 and the entire fixed center universal joint 28 are constantly urged outwardly of the outer drive member 24a (toward the right as viewed in FIGS. 1 and 2) against a stop. In this instance, the stop is a radial shoulder 34c at the end of the hub counterbore 34a which is engaged by the end of the skirt 28c. Extension of the drive axle 23 against the stop shoulder 34c disengages the hub lock 39 since the lugs 32a of the annular disc 32 carried by the bell skirt 28c are axially spaced from the lugs 30b of the hollow stub shaft 30 which functions as the wheel spindle. Thus in the two wheel drive mode, the drive wheel 12 turns freely with respect to the drive line components between the wheel and the transfer case.

In the four wheel drive mode, the drive axle 23 is simply retracted to engage the hub lock 39. More specifically, the outboard joint 28, drive shaft 26 and the inner drive member of the telescopic inboard joint 24 are moved against the bias of the plunger 24d from the extended position shown in FIGS. 1 and 2 to the retracted position shown in FIG. 3 where the hub lock 39 is engaged, that is, lugs 32a are meshed with the lugs 30b. The drive wheel 12 is thus operatively connected to the transfer case via the differential 22 and the drive axle 23.

An important feature is the advantageous use of the variable length drive axle 23 to operate the hub lock 39. Another feature to note is that the variable length drive axle 23 has a telescopic joint which has a little resistance to end motion because of the rolling motion of the drive balls 24c in the drive channels of the outer drive member 24a. With such a joint little force is required to disengage the hub lock 39 even when the drive axle is under appreciable torque and thus the disengage force need only be little more than that necessary to overcome the spring force of the spring biased plunger 24d.

This invention contemplates a conveniently operable way of remotely actuating the hub lock 39 by controlling the length of the drive axle 23. One way is to incorporate a fluid motor for retracting the drive axle 23 and a pneumatically controlled hydraulic system for pressurizing the fluid motor such as that schematically illustrated in FIG. 5.

As indicated above, the hub 34 has seals at each end permitting the universal joint bell 28b and the steering knuckle hub 34 to act as a fluid motor. For this purpose, the hub 34 also has a radial passage 34d which opens into the internal radial shoulder 34c. A fitting 50 threaded into the outer end of the passage 34d connects the interior of the hub to a fluid pressure source which, in the example illustrated in FIG. 5, is a pneumatically controlled hydraulic fluid pressure system. The hub lock 39 is engaged and maintained engaged by pressurizing the hub cavity 34e hydraulically which then moves the outboard joint bell 28b outwardly of the hub 34 like the piston of a fluid motor. This in turn retracts the drive axle 23 against the action of the spring biased plunger 24d. The hydraulic fluid under pressure is supplied by a pneumatically controlled hydraulic accumulator 52 connected to the inlet fitting 50 with a suitable hose and fittings. The accumulator 52 has an air chamber 52a which is connected to a pneumatic pressure source, such as an engine vacuum driven air compressor and reservoir 54, via a supply line 56. The supply line 56 includes a selector valve 58 to control the pneumatic pressure in the air chamber 52a and may conveniently be mounted on the instrument panel of a vehicle in a position easily accessible to the vehicle driver. When the selector valve is in a locked position as shown in solid lines in FIG. 5, the air compressor and reservoir 54 and the air chamber 52a of the accumulator 52 are connected as shown in FIG. 6. This pressurizes the air chamber 52a which in turn pressurizes the hydraulic fluid in the accumulator 52 and in the hub cavity 34e. When the hub cavity 34e is pressurized the drive axle 23 is retracted and the hub lock 39 is engaged.

In order to disengage the hub lock 39, the selector valve 58 is moved to the unlocked position shown in phantom in FIG. 5. In this unlocked position, the air chamber 52a is vented to atmosphere as shown in FIG. 7 which relieves the hydraulic pressure in the hub cavity 34e allowing the drive axle 23 to extend under the action of the spring biased plunger 24d and disengage the hub lock 39.

The hub lock 39 may also be manually engaged and disengaged at the vehicle wheel as in the case of conventional hub locks. This is accomplished by the selector 46 which is rotatable between an unlocked position shown in FIG. 1 and a locked position (not shown). In the unlocked position the cross pin 46a carried by the selector stem engages the low spot of the cam 40a formed at the end of the hollow slide 40. The button at the end of the hollow slide 40 then merely lies against the stem 28d and the bell 28b and is rigid against the stop shoulder 34c under the action of the spring biased plunger 24d. The drive axle 23 is thus held in an extended position where the hub lock 39 is disengaged. In order to manually engage the hub lock 39 the selector 46 is rotated 90° from the position shown in FIG. 1 to a locked position where the cross pin 46a engages the high point of the cam 40a. This cams the hollow slide 40 toward the left as viewed in FIG. 1, which retracts the drive axle 23 and engages the hub lock 39, that is, the lugs 32a carried by the bell mesh with the lugs 30b at the end of the hollow stub shaft 30.

We wish it to be understood that we do not desire to be limited to the exact details of construction shown and described, for obvious modifications will occur to a person skilled in the art.

The embodiments of the invention in which an exclusive property or privilege is claimed are defined as follows:

1. A hub lock for a vehicle wheel which is rotatably mounted on an independently suspended hub and selectively driven by a variable length drive axle which accommodates suspension travel and which has a telescopic universal joint of low end motion resistance at an inboard end connecting the drive axle to a drive device fixed on the vehicle frame, said hub lock comprising:

a first positive clutch part which is connected to the vehicle wheel and which is journalled in the independently suspended hub in an axially fixed relationship, a second positive clutch part which is connected to a universal joint housing at an outboard end of the variable length drive axle and which is engageable with the first part for drivingly connecting the drive axle and the vehicle wheel, said universal joint housing being slidably mounted in the hub for movement between a first position where said hub lock parts are disengaged and a second position where said hub lock parts are engaged, spring means extending the drive axle and biasing the universal joint housing in the first position where the clutch parts are disengaged and fluid motor means for retracting the drive axle and moving the universal joint housing to the second position where the clutch parts are engaged.

2. A hub lock for a vehicle wheel which is rotatably mounted on an independently suspended hub and selectively driven by a variable length drive axle which accommodates suspension travel and which has a telescopic universal joint of low end motion resistance at an inboard end connecting the drive axle to a drive device fixed on the vehicle frame, said hub lock comprising:

a first positive clutch part which is connected to the vehicle wheel and which is journalled in the independently suspended hub in an axially fixed relationship, a second positive clutch part which is connected to a universal joint housing at an outboard end of the variable length drive axle and which is engageable with the first part for drivingly connecting the drive axle and the vehicle wheel, said universal joint housing having a skirt slidably mounted in the hub and movable with respect to the hub between a first position where said hub lock parts are disengaged and a second position where said hub lock parts are engaged, spring means associated with the telescopic universal joint for extending the drive axle and biasing the universal joint housing in the first position, and fluid motor means comprising the hub and the skirt for retracting the drive axle and moving the universal joint housing to the second position.

* * * * *